United States Patent [19]

Fevrier

[11] Patent Number: 5,246,048
[45] Date of Patent: Sep. 21, 1993

[54] TIRE TREAD FOR USE ON SANDY SOIL PROVIDED WITH CLOSED CELLS

[75] Inventor: Daniel Fevrier, Riom, France

[73] Assignee: Compagnie Generale des Etablissements Michelin - Michelin & Cie, Clermont-Ferrand Cedex, France

[21] Appl. No.: 820,896

[22] PCT Filed: Sep. 17, 1990

[86] PCT No.: PCT/FR90/00663

§ 371 Date: Jan. 17, 1992

§ 102(e) Date: Jan. 17, 1992

[87] PCT Pub. No.: WO91/04163

PCT Pub. Date: Apr. 4, 1991

[30] Foreign Application Priority Data

Sep. 25, 1989 [FR] France .................. 89 12625

[51] Int. Cl.⁵ .......................................... B60C 11/11
[52] U.S. Cl. ............................................ 152/209 R
[58] Field of Search ............ 152/209 D, 209 A, 209 R

[56] References Cited

U.S. PATENT DOCUMENTS

| | | | |
|---|---|---|---|
| 3,160,190 | 12/1964 | Jediny | 152/209 R |
| 3,409,064 | 11/1968 | Leonard | 152/209 R |
| 3,532,147 | 10/1970 | Gough et al. | 152/209 R |
| 4,311,179 | 1/1982 | Hayakawa et al. | |
| 4,402,356 | 9/1983 | Musy | 152/209 R |
| 4,456,046 | 6/1984 | Miller | 152/209 R |
| 4,664,166 | 5/1987 | Benisti | 152/209 R |

FOREIGN PATENT DOCUMENTS

| | | | |
|---|---|---|---|
| 2263455 | 7/1974 | Fed. Rep. of Germany | 152/209 A |
| 708976 | 8/1931 | France . | |
| 2205422 | 5/1974 | France . | |
| 0143108 | 7/1985 | Japan | 152/209 D |
| 0261708 | 12/1985 | Japan | 152/209 R |
| 3208705 | 9/1991 | Japan | 152/209 D |
| 1297627 | 11/1972 | United Kingdom | 152/209 R |
| 2005200 | 4/1979 | United Kingdom . | |

Primary Examiner—Michael W. Ball
Assistant Examiner—Nancy T. Krawczyk
Attorney, Agent, or Firm—Brumbaugh, Graves, Donohue & Raymond

[57] ABSTRACT

A tread for tires with radial carcass reinforcement and crown reinforcement formed of at least two plies of cables or cords arranged at angles with the circumferential direction and intended for travel on sand or sandy soil, the tread being provided with closed cells to entrap the sandy soil, the area occupied by the cells being at least 20% of the actual area of contact of the tread with hard flat ground.

5 Claims, 2 Drawing Sheets

5,246,048

TIRE TREAD FOR USE ON SANDY SOIL PROVIDED WITH CLOSED CELLS

BACKGROUND OF THE INVENTION

The present invention relates to the tread of a tire intended to travel on sand or sandy soils, that is to say, soils formed of a mixture of sand and another material in small proportion.

The tread of such a tire is generally formed of blocks of rubber separated from each other in the axial direction of the tire by linear or broken-line longitudinal grooves and/or, in the longitudinal direction of the tire, by transverse grooves which debouch on the edges of the tread. These blocks of rubber are of such a nature that in the contact surface between the tire and hard flat ground they occupy an area of between 40% and 60% of the total area of the contact surface, the tire being mounted on its normal operating rim, bearing the recommended normal load, and being inflated to the corresponding normal pressure recommended for travel on sand.

It is obvious that the conditions of travel recommended for tires of the type in question in the case of travel on sandy tracks or on pure sand are different from the conditions recommended in the case of highway travel: for a given load, it is known that the inflation pressure is lowered, the decrease in inflation pressure possibly amounting to 50% and more of the pressure recommended for highway travel.

Despite this, there are still numerous difficulties encountered by vehicles equipped with such tires when they are confronted by layers of sand of substantial thickness.

SUMMARY OF THE INVENTION

The object of the present invention is to increase the adherence of the tire on sand by modifying the characteristics of the tread, this tire being a tire with radial carcass reinforcement and having a crown reinforcement formed of at least two plies of cords or cables forming small angles of between 10° and 45° with the circumferential direction of the tire.

The tread of the present invention is characterized by the fact that it is provided with closed cells so as to entrap the sandy material or sand without possibility of flow in the contact surface, the area occupied by these cells being at least equal to 20% of the actual area of contact of the tread with hard flat ground, and the maximum depth of the cells being at least equal to 10% of the thickness of the tread.

The area measurements are carried out on flat hard ground to assure reproducibility of the measurements. The actual area of contact of the tread with the ground is the area occupied by the elements in relief which bear on the ground and support the load imposed by the tire. The area occupied by the cells is the area in which there is no contact between the ground and the tread, this lack of contact being due to the presence of the cells alone.

In fact, the tread can possibly be provided with longitudinal and/or transverse grooves in order to impart it a certain flexibility in the longitudinal direction and/or axial direction of the tire, but the area occupied by these grooves in which there is no contact between the tread and the ground is not taken into account.

The cells in accordance with the invention may be of a constant depth, which is then the maximum depth. However, it is advantageous for the cells of the tread to have a variable depth so that the leading walls of the elements in relief which define the cells in the circumferential direction are deeper than their trailing walls, the height of the trailing walls, furthermore, possibly being zero. The filling of the cells by the sand then takes place progressively and more completely. The maximum depth of the cells is advantageously between 20% and 80% of the thickness of the tread, that is to say, the thickness of the rubber above the crown reinforcement.

As seen on the surface of the tread, the cells preferably have the shape of a quadrilateral, with at least two sides parallel to each other and parallel to the axis of rotation of the tire.

As for the surface constituting the bottom of the cells, it is preferably curved in the transverse direction, the curvature facing the ground.

In order to increase the effectiveness of the cells, the tread is preferably of concave shape, that is to say, it has a transverse curvature such that the center of curvature is on the outside of the tire. Such a concavity permits the least flow of the sand at the front of the contact ellipse towards the edges of the tread and thus a better filling of the cells.

The description which follows, read with reference to the accompanying drawings which is given by way of illustration and not of limitation, will make it clear how the invention can be carried out.

DESCRIPTION OF PREFERRED EMBODIMENT

Figure 1:
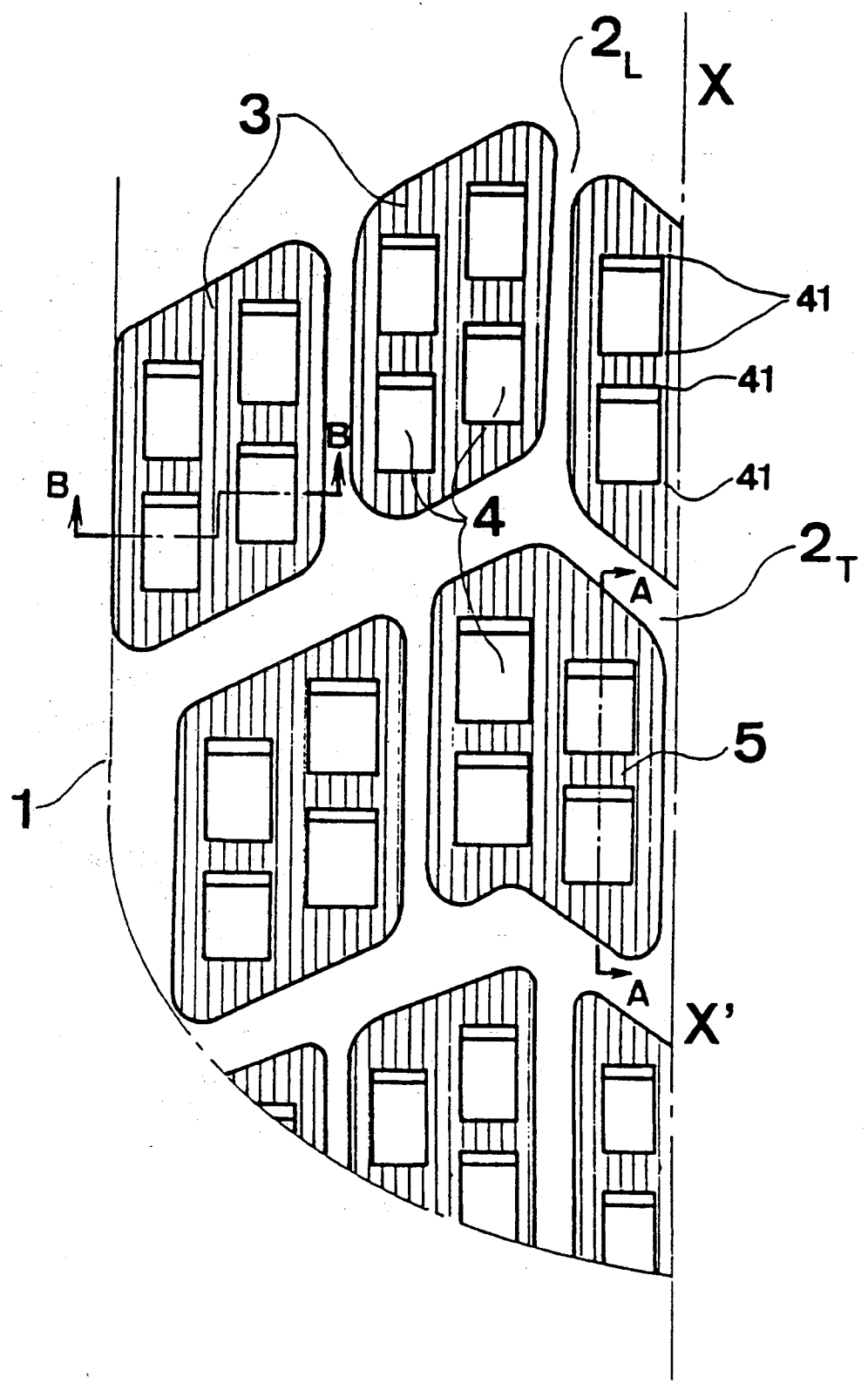
FIG. 1 is a diagrammatic view of a tread in accordance with the invention.

FIG. 1 shows substantially one quarter of the contact surface between hard flat ground and the tread of a 7.50-16 X tire. The tread 1 is provided with portions $2_L$ of longitudinal grooves of slight width (5 mm) and with transverse grooves $2_L$, having a zigzag contour and a width greater than the width of the longitudinal grooves $2_L$. These grooves $2_L$, $2_T$ together define blocks of rubber 3 which are provided with cells 4. These cells 4 are present, in volume, in the form of prismatic wedges and seen in plan view in the form of rectangles, two sides 41 of which are parallel to the axis of rotation of the tire. As shown, these cells are closed, without any possibility of the sand or sandy material which has filled them upon the entrance of the contact surface escaping upon the passage of the cells 4 in the contact surface between the ground and the tread.

The area occupied by the cells 4 is equal, in the example described, to 35% of the actual area of contact on flat ground (hatched portion). Thus, in the surface of contact of the tire with the sandy soil, the friction surface between the grains of material contained in the cells 4 and the grains of material constituting the soil is considerably increased, while the friction surface between the rubber of the tread 1 and the grains of material constituting the soil is proportionally decreased, which leads to better adherence of the tread on sandy material.

Figure 2:
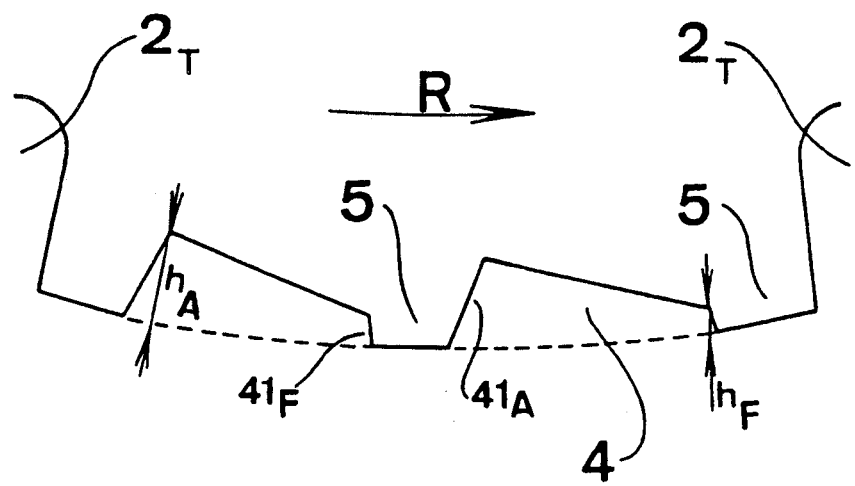
FIG. 2 is a longitudinal section along the line A—A of FIG. 1.

In FIG. 2, the cells 4 have a variable depth h which increases from a value $h_F$ to a value $h_A$. If the arrow R represents the direction of rotation of the tire, the wall 41A of the cell 4 corresponding to the leading face of the element in relief 5, that is to say, the face of the element in relief which first penetrates into the contact ellipse, has a height $h_A$, measured perpendicular to the surface of the tread 1, which is greater than the height $h_F$ of the wall 41F of the element in relief 5. The height $h_F$ is small and generally less than 2 mm, whatever the size of the tire, and it may be zero. As for the height $h_A$, it is 25% of the thickness of the tread, and in the case described, it is 4 mm.

Figure 3:
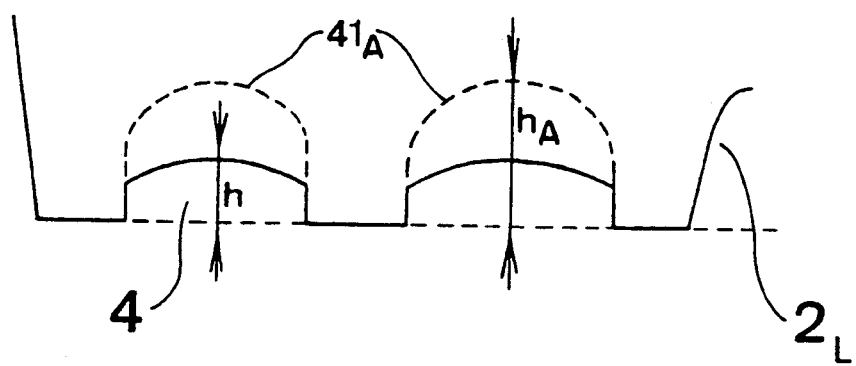
FIG. 3 is a transverse section along the line B—B of FIG. 1, with a preferred embodiment of the surface of the bottom of the cells.

FIG. 3 shows, in a section along the transverse line B—B of FIG. 1, a preferred solution with regard to the bottom of the cells. This bottom is a curved surface, the curvature of which faces the ground, that is to say, a surface the centers of curvature of which are located outside the rubber of the tread 1, which has the effect of increasing the contact pressure between the grains of sandy material which are entrapped in the cells 4.

Figure 4:
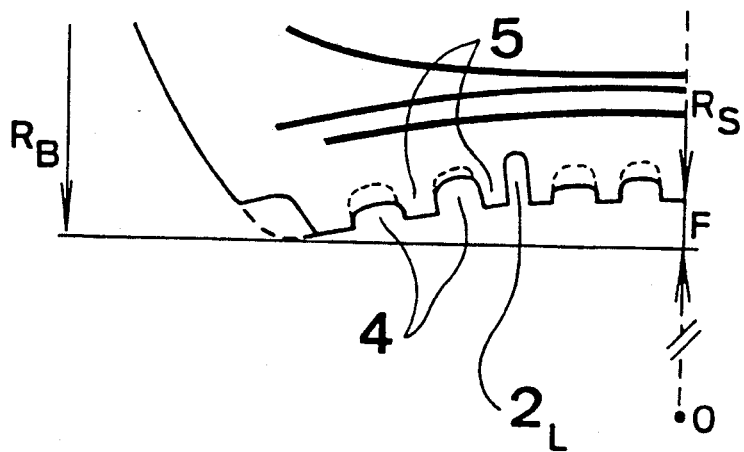
FIG. 4 shows a concave tread in accordance with a preferred embodiment.

FIG. 4 is a transverse half section through a tire provided with a tread, the surface of which is concave, the center of curvature 0 being outside the tire. The concavity, measured by the distance F, which is the difference between the radius $R_B$ of the edges of the tread 1 measured with respect to the axis of rotation of the tire and the radius $R_S$ of the center of the tread measured with respect to the same axis referred to the radius $R_S$, is preferably 0.03 and in all cases greater than 0.012. Stated differently, the concavity, measured by the ratio $$\frac{R_B - R_S}{R_S}$$

is at least equal to 0.012.

The 7.50-16 X tire described was the object of tests on sand, under a load of 520 kg, inflated to a pressure of 0.8 bars. Two identical tires were mounted on the drive axle of an "all-terrain" vehicle braked so as to obtain a slippage between the tires and the sand which could be between 5 and 400%. If the force X developed by the tires is measured, those tires, the treads of which are provided with cells, show an average gain of 15% as compared with the same tires without cells on the treads, this average gain increasing to 20% if the tread is concave, as described previously.

I claim:

1. A tread, which extends around the circumference of a tire having radial carcass reinforcements and crown reinforcements formed of at least two plies of cables or cords forming slight angles with the circumferential direction and intended for travel on sand or sandy soil, characterized by being provided with closed cells, the area occupied by the cells is at least 20% of the actual area of contact of the tread with hard flat ground when the tire is mounted on its normal rim of use, bearing the load recommended, and inflated to the pressure recommended for ravel on sand, the cells have a variable depth such that the leading faces of the elements in relief which circumferentially define the cells have a height greater than the trailing faces of the elements in relief, the height measured from the cell bottom to the surface of the tread, the maximum depth of the cells being at least equal to 10% of the thickness of the tread.

2. A tread according to claim 1, in which the height of the trailing face is zero and the height of the leading face is between 20% to 80% of the thickness of the tread.

3. A tread according to claim 1, in which the bottom of the cells is a transversely curved surface, the centers of curvature of said surface being located outside the rubber of the tread.

4. A tread according to claim 1, in which, seen in plan view on the surface of the tread, the cells have a quadrilateral cross section, defined by the leading and trailing faces and two sides which are parallel to each other and to the axis of rotation of the tire.

5. A tread according to claim 1, in which the tread surface is transversely concave, the concavity, measured by the $$\frac{RB - RS}{RS}$$

being at least equal to 0.012, RS and RB being the radii of the center and edges, respectively, of the tread with respect to the axis of rotation of the tire.

* * * * *

UNITED STATES PATENT AND TRADEMARK OFFICE
CERTIFICATE OF CORRECTION

PATENT NO. : 5,246,048
DATED : Sept. 21, 1993
INVENTOR(S) : Fevrier

It is certified that error appears in the above-identified patent and that said Letters Patent is hereby corrected as shown below:

Col. 2, line 47, "grooves $2_L$" should read --grooves $2_T$--.

Col. 4, line 16, "ravel" should read --travel--;

line 25, "20% to 80%" should read --20% and 80%--; and line 38, "by the" should read --by the ratio--.

Signed and Sealed this

Twenty-sixth Day of April, 1994

Attest:

BRUCE LEHMAN

Attesting Officer         Commissioner of Patents and Trademarks